United States Patent [19]

Badertscher et al.

[11] 4,075,196

[45] Feb. 21, 1978

[54] PRODUCTION OF CASEIN AND CASEINATES

[75] Inventors: Ernest Badertscher, Orbe; Michel Chaveron, Vevey, both of Switzerland

[73] Assignee: Societe d'Assistance Technique pour Produits Nestle S.A., Lausanne, Switzerland

[21] Appl. No.: 575,207

[22] Filed: May 7, 1975

[30] Foreign Application Priority Data

June 7, 1974 Switzerland .......................... 7780/74

[51] Int. Cl.$^2$ .............................................. A23J 1/20
[52] U.S. Cl. .................................................... 260/120
[58] Field of Search ................................. 260/119, 120

[56] References Cited

U.S. PATENT DOCUMENTS

| 2,468,730 | 5/1949 | Block | 260/120 |
| 2,518,493 | 8/1950 | Reyniers | 260/120 |
| 2,714,068 | 7/1955 | Bernhart | 260/120 |
| 3,252,961 | 5/1966 | Rodgers | 260/120 |
| 3,361,567 | 1/1968 | Engel | 260/120 |
| 3,883,675 | 5/1975 | Fujii | 260/120 |
| 3,886,300 | 5/1975 | Fujii | 260/120 |

*Primary Examiner*—Paul R. Michl

[57] ABSTRACT

A process for the continuous production of casein and caseinates, which comprises destabilizing a colloidal solution with the composition of a skimmed milk and converting it into a mixture of curd and serum, separating the curd from the serum, introducing the curd in the form of grains into a stream of washing liquid, passing the mixture of curd grains and washing liquid under turbulent conditions through at least one tube, and separating the curd from the washing liquid.

14 Claims, No Drawings

PRODUCTION OF CASEIN AND CASEINATES

This invention relates to a process for the production of casein and caseinates.

More particularly the invention relates to a process for the production of casein and caseinates, in which a colloidal solution with the composition of a skimmed milk is converted into a mixture of curd and serum, the curd subsequently being separated from the serum and washed.

Casein is the colloidal protein constituent of milk which is precipitated by treatment with rennet under neutral or weakly acid pH conditions or by means of a mineral salt, such as calcium salt, or by means of acids at a pH of from 4.6 to 5.6. Casein is valued for its richness in essential amino acids. Its lysine content makes it particularly suitable for the enrichment of cereal-based foods.

Casein is generally extracted from skimmed milk. It is coagulated by treating milk with a destabilising agent, such as an acid, a mineral salt or rennet, and then separated from the residual lactoserum by means of a separator or filter. It is then washed with large quantities of water and dried.

Various processes for the continuous production of casein and caseinates have already been proposed. Either the milk is destablised in batches in a chamber kept at low temperature, and then pumped into a unit in which coagulation is obtained by heating, or the milk is destablised and heated under agitation, for example by introducing it into a sufficiently narrow tube. In general, grains of casein with a uniform particle size are obtained. These grains do not agglomerate and lend themselves both to separation from the serum and to subsequent washing. Conventional separation should not be too vigorous so as not to produce excessively fine particles which would be entrained either by the serum or, subsequently, by the water used for washing. The actual washing phase uses large quantities of water, i.e., up to 1 liter of water per liter of milk treated. One conventional washing process is carried out in fairly large tanks in which the casein and the water used for washing are mechanically mixed over prolonged periods, equivalent in some cases to tens of minutes, separation of the washed casein and the water being carried out either by filtration or by decantation. Another known washing process comprises spraying the casein from one or more spray nozzles arranged above a conveyor or Archimedean screw conveying the casein along a screen. It is also known that a solid curd, which has been compressed and rolled on a conveyor and then washed, can be purified by size-reducing it in a mill in the presence of water and subsequently centrifuging the dispersion thus obtained. These size-reducing and centrifuging operations may be repeated several times. However, this treatment cannot be applied to a standard acid, rennet or phosphocalcic casein, because they are too friable or soft and would produce too many fines.

An object of the invention is to reduce the quantity of water required for washing and to simplify and rationalise conventional installations by eliminating units of large dimensions and by permitting the use of effective systems.

The pressent invention provides a process for the continuous production of casein and caseinates, which comprises destabilising a colloidal solution with the composition of a skimmed milk and converting it into a mixture of curd and serum, separating the curd from the serum, introducing the curd in the form of grains into a stream of washing liquid, introducing the mixture of curd grains and washing liquid under turbulence into at least one tube, and separating the curd from the washing liquid.

This principle of tube washing under turbulence is extremely effective in view of the fact that the entire surface of each grain is continuously flushed by the washing liquid in which it is whirled around. Maximum effectiveness in minimum time is obtained by the fact that the only limiting factors are the time required by the serum and lactose to diffuse through the grain and the degree of purity of the washing liquid.

Optimum turbulence may be obtained by adequately dimensioning the washing tube in dependence both upon the required throughput and upon the selected ratio between the casein and washing liquid. It is advisable to use diaphragms or at least one constriction in the tube in order further to intensify turbulence.

It is clear that the adoption of a method of washing as vigorous as this involves certain modifications in the design of an installation or production line for producing casein. It has been found that the simplification of a washing installation obtained by replacing a large tank for example with a simple tube can have favourable repercussions upon the design of a complete production line. Although it may be necessary to use an arrangement for separating the grains of curd from the washing liquid which is much more effective than gravity or pressure filtration or decantation, for example an arrangement using centrifugal force, this necessity is accompanied by the possibility of using an arrangement of this kind for separating the curd from the serum as well, which hitherto it has been preferred to avoid for fear of introducing too many fines into the washing installation. This possibility itself eliminates the need to provide a unit for recovering the fines entrained by the serum issuing from a separation unit in the form of, for example, a vibrating screen or rollers. Similarly, an effective unit for separating the casein from the washing liquid positioned at the output end of a washing tube suggests the provision of a less sophisticated and hence less expensive unit at the output end of a second washing tube, the less pure waters issuing from this less perfected and hence less effective unit, such as a roll separator or a vibrating screen for example, being able to be used as washing liquid in a first washing tube at whose output end is situated the above-mentioned effective separator. A pure washing liquid is only necessary in this case for feeding the second washing tube. In this way, it is possible to make considerable economies on pure washing liquid in relation to the quantities used in single-stage washing without, at the same time, incurring excessive costs on additional equipment.

Finally, it should be pointed out that the process according to the invention represents a significant advance in production hygiene. As will be appreciated from the foregoing, it is possible, by virtue of the process according to the invention, to design a casein production line or installation in the form of an enclosed line which may thus be sterilised and kept sterile by means of a pasteurising unit until the end product emerges.

Although the process according to the invention may be used with advantage in any casein production line, provided that the curd is capable of being dispersed in the form of grains in the washing liquid, it is clear that it is particularly suitable for the continuous production of casein in which the skimmed milk is coagulated in the form of grains. Coagulation of this kind may be obtained by vigorously agitating the milk under temperature or pH conditions suitable for precipitation, the necessary agitation and mixing being obtainable either by highly turbulent flow or under the effect of a jet of stream for example.

The process according to the invention may be used for the production of acid casein, caseinates, phosphocalcic casein and rennet casein. The process is preferably carried out continuously in a closed loop, into which a few thousand liters per hour of skimmed milk or renneted milk may be introduced by pumping. It is advisable to carry out all the heating, pasteurising, cooling and washing operations under turbulent conditions. One known criterion, which enables the intensity of turbulence of a flow to be estimated or predetermined is the product VDe where V is the mean rate of flow of a liquid circulating in a pipe or through an opening, whilst De is the quotient of four times the cross-section of the pipe or opening in question divided by the circumference wetted. In the case of a circular opening or a cylindrical pipe, De = the diameter D. It is possible to envisage throughputs of approximately 2700 to 10,000 l/h which, for recommendable VDe values of the order of 140 to 650 cm$^2$/sec for the washing tube, gives a choice of diameters of from 35 to 100 mm, the preferred diameters being 35 mm for a throughput of 3000 l/h and 55 or 70 mm for a throughput of 10,000 l/h. A similar choice may be made for the coagulating, heating, pasteurising, cooling operations, etc. The length of the various pipes may readily be calculated from the throughput, diameter and residence time, i.e. the period of time for which the skimmed milk, the suspension of curd in the serum or the dispersion of curd in the washing liquid has to remain in a given pipe, in other words the time which it requires to flow from one end to the other. In the case of pasteurisation for example, the residence time may be of the order of 20 to 60 seconds in dependence upon the temperature selected in a range from 70 to 80° C which, for a diameter of 35 mm and a throughput of 3000 l/h or a diameter of 70 mm and a throughput of 10,000 l/h for example, gives lengths of the order of 15 to 50 meters.

In the case of washing, the residence time, which should be long enough to enable the serum to diffuse from the center to the surface of the grains of curd, may be between about 23 to 135 seconds. The lower limit really only applies to each stage of a double washing operation with recycling, by virtue of which it is possible to save not only on drinking water, but also on the lengths of tubing. For single-stage washing, it is advisable to provide for a residence time of the order of one minute and to use as much water as milk treated, which gives tube lengths of the order of 13 to 100 meters. It should incidentally be noted that washing in two stages may be carried out with less than half and even with one fifth of the quantity of water recommended for single-stage washing. In the case of acid and rennet caseins, the washing tube may be in two sections, one in which the temperature of the dispersion of curd in water is kept at a level of 45° to 55° C, which is favourable to effective washing without any danger of the grains sticking to one another and agglomerating, and a second section in which the temperature is gradually reduced to a level of 25° to 35° C which is favourable to subsequent centrifuging. In the case of phosphocalcic casein, a temperature of 45° to 55° C, which may be perfectly suitable for washing, is also favourable to centrifuging and the washing tube need only comprise a single section.

Similarly, it is advisable for the suspension of curd in the serum to enter a first centrifugal separator at a temperature of from 25° to 35° C or from 45° to 55° C, depending on whether the casein is an acid, rennet, or phosphocalcic casein. It is clear that, since the application of the process involves the use of effective separators of the centrifugal type, preferably of the horizontal centrifugal decanter type, the curd obtained after separation of the serum or other separation of the washing liquid can have a solids content (TC) of from 40 to 50% which is much higher than the 30% obtained by conventional separation of the serum on a vibrating screen for example. This also plays a significant part in promoting the effectiveness of washing.

The intensity of turbulence during washing may be increased by forming the washing tube with a constriction or by providing it with a diaphragm of which the VDe is greater than 650 and preferably in the range from 900 to 1000 cm$^2$/second. Similar measures may be taken during coagulation so as to provide the grains with a fairly well defined and uniform size, in other words to "normalise" them.

Finally, in the interests of completeness and before moving on to detailed examples, it is also pointed out that, in the case of acid casein, the skimmed milk may be acidified by injecting hydrochloric acid for example so as to lower the pH of the skimmed milk to 4.6. In the case of rennet casein, renneting may be carried out by adding approximately 20 g of rennet per 1000 liters of skimmed milk over a period of 2 hours at a temperature of 10° to 12° C for example. In the case of phosphocalcic casein, calcium chloride may be added to the skimmed milk in a quantity of 16 liters in an aqueous solution containing 17.5% of $CaCl_2$ per 1000 liters of skimmed milk for example. Destabilisation may only be carried out before introduction of the skimmed milk into a continuous production line in the case of rennet casein whilst, in the two other cases, it may take place in the same production line either before or after a heating stage required for coagulation. Heating may optionally be combined with pasteurisation. In cases where destabilisation is carried out after heating or pasteurisation, the process according to the invention may also be used for the production of casein and caseinates from a skimmed milk reconstituted from a skimmed milk powder and water. The heating and pasteurising operations are preferably carried out by combining an injection of steam followed by a dwell tube. Subsequent cooling may be obtained by means of tubular heat exchangers. There then follow the separating and washing operations described above and, finally, the final processing envisaged for the caseins issuing from the final separation stage. The caseins may be dried in any suitable adequate manner. Drying may be carried out, for example, in a fluidised bed or on rollers, followed by bagging, or alternatively the casein may be size-reduced in the presence of water and the suspension of size-reduced casein spray dried. In the production of caseinates, the washed acid casein may be neutralised by the addition of any required quantity of alkali, such as sodium hydroxide, potassium hydroxide or calcium hydroxide, to a mixture of casein and water kept at a temperature of 45° C for example.

The invention is illustrated by the following examples:

EXAMPLE 1

10,000 l/h of skimmed milk are introduced by a positive pump at a temperature of approximately 15° C into a 50 mm diameter dwell tube at whose input end is positioned a steam injector which increases the temperature of the skimmed milk to 78° C. The residence time at 78° C in the dwell tube, i.e. the pasteurisation time, is 20 seconds, after which the pasteurised skimmed milk enters a 50 mm diameter cooling tube in which it is cooled to 55° C. An acid injector positioned at the output end of the cooling tube introduces approximately 180 kg/h of 10% hydrochloric acid into the skimmed milk whose pH falls to 4.6, after which the acidified skimmed milk enters a 70 mm diameter cooling tube in which the grains of curd are formed and textured. The mixture of serum and curd grains leaves the cooling tube at 20° C and enters a horizontal centrifugal decanter which discharges, on the one hand, a serum with a TC of approximately 6% and, on the other hand, approximately 670 kg/h of curd with a TC of approximately 45% to which 10,000 l/h of water at 50° C are added. The curd and washing water are delivered by a positive pump into a 70 mm diameter dwell tube preceded by a diaphragm whose opening has a diameter of 35 mm. After having passed through the dwell tube in about 30 seconds, the turbulent dispersion of curd in the washing water enters a 70 mm diameter cooling tube through which it travels in, once again, about 30 seconds and which it leaves at a temperature of 30° C to enter a second horizontal centrifugal decanter. This second horizontal centrifugal decanter discharges, on the one hand, a washing water with a TC of approximately 0.3% and, on the other hand, 613 kg/h of a washed curd with a TC of approximately 45%. This casein contains, in percent by weight of dry material, 95% of proteins, 0.5% of lactose, 3.5% of mineral salts and 1% of fats. The casein is dried in a fluidised bed to a TC of approximately 90% and then packed into bags.

EXAMPLE 2

10,000 l/h of skimmed milk with a temperature of 10° C enter a preheating tube which they leave at a temperature of 35° C. 10% hydrochloric acid is then introduced by a metering pump into the stream of preheated skimmed milk so as to lower its pH to 4.6. The stream of acidified milk is then heated to a temperature of 72° C by injecting steam into it and, at this temperature, flows over a period of one minute through a 70 mm diameter dwell tube in which the grains of curd are textured. The dispersion of curd grains in the serum then travels through a cooling tube which it leaves with a temperature of 30° C to enter a horizontal centrifugal decanter which discharges, on the one hand, the serum and, on the other hand, the curd to which 10,000 l/h of water at 45° C are added. The curd and washing water are delivered by a positive pump into a washing tube 70 mm in diameter and 78 meters long, of which the first two thirds acts as a dwell tube and the last third as a cooling tube. The cooling tube delivers the turbulent dispersion of curd in the washing water at a temperature of 30° C into a horizontal centrifugal decanter which discharges, on the one hand, a washing water which is removed and, on the other hand, at a rate of approximately 600 kg/h, a casein with a TC of approximately 50% comparable in quality to the casein obtained in Example 1. The casein is then size-reduced in water and spray dried.

EXAMPLE 3

Skimmed milk is renneted with 20 g of rennet per 1000 liters of milk over a period of 2 hours at a temperature of from 10° to 12° C. The renneted skimmed milk is pumped at a rate of 2700 l/h into a continuous production line of the kind described in the preceding Examples and comprising in series the following components: a steam injector which heats the renneted milk to 45° C; a dwell tube for coagulation under turbulent conditions 35 mm in diameter with a capacity of 40 liters; a diaphragm for normalising the grain size of the curd whose opening has a diameter of 12 mm; a steam injector which increases the temperature to 71° C; a dwell tube or pasteurising tube 35 mm in diameter and 35 meters long; a normalising diaphragm with an opening diameter of 12 mm; a cooling tube 35 mm in diameter with a capacity of 40 liters which lowers the temperature of the suspension of curd in the serum to a level of from 30° to 35° C; a horizontal centrifugal decanter; a pump delivering the separated curd mixed with 2700 l/h of drinking water at 35° C; a tube 35 mm in diameter with a capacity of 100 liters for washing under turbulent conditions; a horizontal centrifugal decanter separately discharging a washing water, which is removed, and approximately 200 kg/h of rennet casein with a TC of approximately 45%. This casein consists of (in percent of dry material) 90% of proteins, 0.5% of lactose and 8.5% of mineral salts. The casein is then size-reduced in the presence of water and spray dried.

EXAMPLE 4

Skimmed milk is renneted with 20 g of rennet per 1000 liters of milk over a period of 2 hours at a temperature of from 10° to 12° C. The renneted skimmed milk is then subjected to the following successive operations in a continuous production line: introduction into the line by pumping at a rate of 3900 l/h; increasing temperature to 45° C by injecting steam; coagulation under turbulent conditions in a dwell tube 35 mm in diameter with a capacity of 40 liters, i.e. 42 meters long; an increase in temperature to 70° C by injecting steam; pasteurising of the suspension of curd grains in the serum by passage over a period of 45 seconds at 70° C through a 55 mm diameter dwell tube; cooling to 30° C by passage through a suitable dwell tube 35 mm in diameter and 42 meters long; separation of the curd from the serum by centrifuging in a first horizontal decanter; addition to the curd of 780 l/h of used washing water; size-reduction of the dispersion of casein in the washing water in a mill; initial washing under turbulent conditions in a tube 35 mm in diameter and 28 meters long; separation of the curd from the twice-used washing water, which is removed, by centrifuging in a second horizontal decanter; addition to the washed curd of 780 l/h of drinking water at 35° C; second washing under turbulent conditions in a tube 35 mm in diameter and 26 meters long; separation of the curd from the washing water by means of an arrangement of rollers, the washing water separated being recycled and used as the used washing liquid for the initial washing stage. The curd leaves the roller separator at a rate of 260 kg/h with a TC of approximately 45%. This casein consists of (in percent of dry material) 90% of proteins, 0.5% of lactose and 8.5% of mineral salts. The casein is then size-reduced in the presence of water and spray dried.

EXAMPLE 5

A rennet casein is prepared in the same way as described in Example 4, except that the successive operations of heating at 45° C and pasteurisation at 70° C are combined into a single pasteurising operation at 78° C. The casein obtained has the same characteristics and the same composition as the casein described in Example 4.

EXAMPLE 6

A skimmed milk with a temperature of approximately 10° C is pumped at a rate of 3900 l/h into a continuous production line in which it successively undergoes the following treatments: heating to 50° C by injecting steam; destabilisation with $CaCl_2$ by the addition of 63 l/h of an aqueous solution containing 17.5% of $CaCl_2$; coagulation under turbulent conditions by passage in 37 seconds through a 35 mm diameter dwell tube; heating to a temperature of from 75° to 80° C by injecting steam; pasteurisation by passage in 20 seconds through a 35 mm diameter dwell tube; cooling to 50° C by passage in 37 seconds through a 35 mm diameter tubular heat exchanger; separation of the grains of curd from the serum in a horizontal decanter; dispersion of the curd in 3900 l/h of drinking water at 45° C; washing under turbulent conditions by ascent through a vertical tube 100 mm in diameter and 100 liters capacity, i.e. 12.70 meters tall; separation of the dispersion of curd in the washing water in a horizontal centrifugal decanter. The curd is then size-reduced in the presence of water and spray dried. 110 kg/h of phosphocalcic caseinate with a TC of 97% are thus obtained. It consists of (in percent of dry material) 86% of proteins, 10% of ash and 0.5% of lactose.

EXAMPLE 7

A skimmed milk with a temperature of from 5° to 10° C is pumped at a rate of 3000 l/h into a production line for the continuous product of casein and caseinates, where it successively undergoes the following treatments or conversions: heating to 78° C by injecting steam; residence for 20 seconds at this temperature in a 35 mm diameter dwell tube; cooling to 55° C in a 35 mm diameter tubular heat exchanger; acidification to pH 4.6 by injecting 10% HCl; coagulation under turbulent conditions in a 50 mm diameter tube; cooling to 20° C in a 50 mm diameter tubular heat exchanger; separation of the serum from 200 kg/h of curd in grain form with a TC of 45% by centrifuging; dispersion of the curd in 3000 l/h of drinking water at 45° C; washing under turbulent conditions in a tube 50 mm in diameter and 18 meters long; cooling to 30° C in a 50 mm diameter tubular heat exchanger; separation from the washing water of 184 kg/h of washed curd with a TC of 45%. The casein obtained has the same composition as in Example 1. It is neutralised by mixing at 45° C with 100 kg/h of water and 59.4 kg/h of a 5% solution of lime in the feed pipe leading to the mill. 343 kg/h of size-reduced caseinate with a TC of 25% are collected, and are pasteurised for 20 seconds at 80° C in a tubular heat exchanger and then dried in a drying tower to give 88 kg/h of calcium caseinate with a moisture content of 4%.

EXAMPLE 8

A skimmed milk powder obtained by concentrating a skimmed milk, followed by spray drying, and containing 3% of moisture and less than 10% of denatured serum proteins is converted into a colloidal solution in a quantity of 180 kg per 1000 liters of drinking water. Air included in the reconstituted skimmed milk during dissolution is removed, after which the reconstituted skimmed milk is treated in the manner described in Example 1. The casein obtained is entirely comparable with the casein obtained in Example 1 both from the point of view of appearance and from the point of view of composition.

EXAMPLE 9

The reconstituted and deaerated skimmed milk described in Example 8 is treated in the manner described in Example 7. The caseinate obtained has all the qualities of the caseinate obtained in Example 7.

We claim:

1. A process for the continuous production of casein and caseinates, which comprises
   destabilizing a colloidal solution with the composition of a skimmed milk and converting the solution into a mixture of curd and serum,
   separating the curd from the serum,
   introducing the curd in the form of grains into a stream of washing liquid,
   passing the mixture of curd grains and washing liquid under turbulent conditions through a first tube,
   separating the curd from the washing liquid and introducing the curd in the form of grains into a second stream of water,
   thereafter introducing the mixture of curd grains and second stream of water under turbulent conditions into a second tube,
   thereafter separating the curd from the water, and
   using the water obtained from this separation as washing liquid in the first tube wherein the quantity of water used is from 0.2 to 0.4 liters per liter of colloidal solution treated.

2. A process as claimed in claim 1, wherein the colloidal solution is a renneted skimmed milk with a temperature below about 12° C and is converted into a mixture of curd and serum by a single pasteurising operation carried out continuously over a period of from 20 to 60 seconds at a temperature in the range from 70° to 80° C.

3. A process as claimed in claim 1, wherein the colloidal solution is destabilised with rennet or an acid and, before their separation, the temperatures of the mixtures of curd and serum and of curd and washing liquid are adjusted to 25° to 35° C.

4. A process as claimed in claim 1, wherein the colloidal solution is destabilised with a calcium salt and, before their separation, the temperature of the mixtures of curd and serum and of curd and washing liquid are adjusted to a level of from 45° to 55° C.

5. A process as claimed in claim 1, wherein the colloidal solution is obtained by mixing water and a skimmed milk powder containing less than 10% of denatured serum proteins.

6. A process as claimed in claim 1, wherein the residence time of the mixture of curd grains and washing liquid in each tube is 23 to 135 seconds.

7. A process as claimed in claim 1, wherein each flow conditions in the tube correspond to a VDe value of from 140 to 650 $cm^2$/sec, V being the mean rate of flow in each tube of mixture of grains of curd and washing liquid, De being the quotient of four times the cross-section of the tube divided by the circumference wetted.

8. A process as claimed in claim 1, wherein turbulence is intensified by forcing the mixture of grains of curd and washing liquid to flow through at least one constriction of a respective tube where the flow conditions correspond to a VDe value of greater than 650 cm²/sec.

9. A process as claimed in claim 8, wherein the flow conditions through the constriction correspond to a VDe value of from about 900 to 1000 cm²/sec.

10. In a process for the continuous production of casein and caseinates comprising the steps of
destabilizing a colloidal solution with the composition of a skimmed milk;
converting the destablized solution into a mixture of curd and serum;
separating the curd from the serum;
forming the curd into grains;
thereafter introducing the grains of curd into a stream of washing liquid to form a mixture;
passing the mixture of curd grains and washing liquid under turbulent conditions through at least one washing tube at a flow rate having a V De value within the range of 140 to 1000m²/sec, V being the mean rate of flow in the tube of the mixture of grains of curd and washing liquid, De being the quotient of four times the cross-section of the tube divided by the circumference wetted, whereby the washing liquid continuously flushes the entire surface of each grain;
thereafter separating the curd grains from the washing liquid and introducing the curd in the form of grains into a second stream of water,
thereafter introducing the mixture of curd grains and second stream of water under turbulent conditions into a second tube,
thereafter separating the curd from the water, and
using the water obtained from this separation as washing liquid in the first tube wherein the quantity of water used is from 0.2 to 0.4 liters per liter of colloidal solution treated.

11. A process as set forth in claim 10 wherein the product (VDe) of the mean rate of flow (V) of the mixture of curd grains and washing liquid through the washing tube and the quotient of four times the cross-section of the washing tube divided by the circumference wetted (De) is in the order of 140 to 650 cm²/sec.

12. A process as set forth in claim 11 wherein the washing tube has a constriction to intensify turbulence and wherein the product (VDe) of the mean rate of flow (V) of the mixture of curd grains and washing liquid through the washing tube and the quotient of four times the cross-section of the washing tube divided by the circumference wetted (De) is in the order of 900 to 1000 cm²/sec.

13. A process as claimed in claim 1 wherein turbulence is intensified by forcing the mixture of grains of curd and washing liquid to flow through at least one diaphragm where the flow conditions correspond to a VDe value of greater than 650 cm²/sec.

14. A process as claimed in claim 13 wherein the flow conditions through the diaphragm correspond to a VDe value of from about 900 to 1000 cm²/sec.

* * * * *

UNITED STATES PATENT AND TRADEMARK OFFICE
CERTIFICATE OF CORRECTION

PATENT NO. : 4,075,196
DATED : February 21, 1978
INVENTOR(S) : Ernest Badertscher, Michel Chaveron It is certified that error appears in the above-identified patent and that said Letters Patent are hereby corrected as shown below:

Column 1, line 15, after "as" insert -- a --

Column 1, line 28, change "destablised" to --destabilised --

Column 1, line 31, change "destablised" to -- destabilised --

Column 3, line 49 change "to" to -- and --

Column 4, line 12, change "other" to --after--

Column 4, line 36, change second "in" to -- of --

Signed and Sealed this

Twentieth Day of June 1978

[SEAL]

Attest:

RUTH C. MASON
Attesting Officer

DONALD W. BANNER
Commissioner of Patents and Trademarks